(12) United States Patent
Esaki

(10) Patent No.: US 11,455,993 B2
(45) Date of Patent: Sep. 27, 2022

(54) ELECTRONIC DEVICE CONTROLLING SYSTEM, VOICE OUTPUT DEVICE, AND METHODS THEREFOR

(71) Applicant: SOCIONEXT INC., Kanagawa (JP)

(72) Inventor: Kotaro Esaki, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 203 days.

(21) Appl. No.: 16/810,568

(22) Filed: Mar. 5, 2020

(65) Prior Publication Data
US 2020/0202861 A1 Jun. 25, 2020

Related U.S. Application Data

(63) Continuation of application No. PCT/JP2017/033360, filed on Sep. 14, 2017.

(51) Int. Cl.
*G10L 15/22* (2006.01)
*G10L 13/00* (2006.01)
*G10L 15/30* (2013.01)

(52) U.S. Cl.
CPC ............. *G10L 15/22* (2013.01); *G10L 13/00* (2013.01); *G10L 15/30* (2013.01); *G10L 2015/223* (2013.01)

(58) Field of Classification Search
USPC ................. 704/246, 247, 251, 252
See application file for complete search history.

(56) References Cited

U.S. PATENT DOCUMENTS

| 5,267,323 A | 11/1993 | Kimura | |
|---|---|---|---|
| 2002/0128846 A1 * | 9/2002 | Miller | A61B 8/461 704/275 |

(Continued)

FOREIGN PATENT DOCUMENTS

| CN | 101115088 A | 1/2008 |
|---|---|---|
| CN | 201622839 U | 11/2010 |

(Continued)

OTHER PUBLICATIONS

Chinese Office Action dated Jun. 30, 2021 for the corresponding Chinese Patent Application No. 201780094757.3, with English translation as a concise explanation.

(Continued)

*Primary Examiner* — Leonard Saint Cyr
(74) *Attorney, Agent, or Firm* — McDermott Will & Emery LLP

(57) ABSTRACT

An electronic device controlling system that provides an instruction via voice for an operation of a speech recognition-capable electronic device includes a control device and a voice output device capable of communicating with the control device. The control device includes a first input unit that receives, from an operator, a first input to which a first operation instruction for the speech recognition-capable electronic device is assigned; and a transmitter that, when the first input unit receives the first input, transmits, to the voice output device, first information for communication corresponding to the first operation instruction assigned to the first input. The voice output device includes a receiver that receives the first information for communication from the control device; and an output unit that, when the receiver receives the first information for communication, outputs a first voice for the first operation instruction based on the first information for communication.

16 Claims, 10 Drawing Sheets

(56) References Cited

U.S. PATENT DOCUMENTS

| | | | | |
|---|---|---|---|---|
| 2015/0154976 A1* | 6/2015 | Mutagi | ................. | H04L 12/281 |
| | | | | 704/275 |
| 2015/0206530 A1* | 7/2015 | Choi | ....................... | G10L 15/22 |
| | | | | 704/249 |
| 2016/0056782 A1* | 2/2016 | Lee | ..................... | H04M 1/6058 |
| | | | | 381/107 |
| 2017/0004828 A1* | 1/2017 | Lee | ......................... | G10L 17/24 |
| 2017/0133013 A1* | 5/2017 | Tsai | ......................... | G10L 25/51 |

FOREIGN PATENT DOCUMENTS

| | | |
|---|---|---|
| JP | H03-203797 A | 9/1991 |
| JP | H07-154874 A | 6/1995 |
| JP | 2000-020091 A | 1/2000 |
| JP | 2001-53894 A | 2/2001 |
| JP | 2001-175284 A | 6/2001 |
| JP | 2002-252884 A | 9/2002 |
| JP | 2012-194215 A | 10/2012 |

OTHER PUBLICATIONS

International Search Report dated Nov. 28, 2017 in International Patent Application No. PCT/JP2017/033360, with English translation.

\* cited by examiner

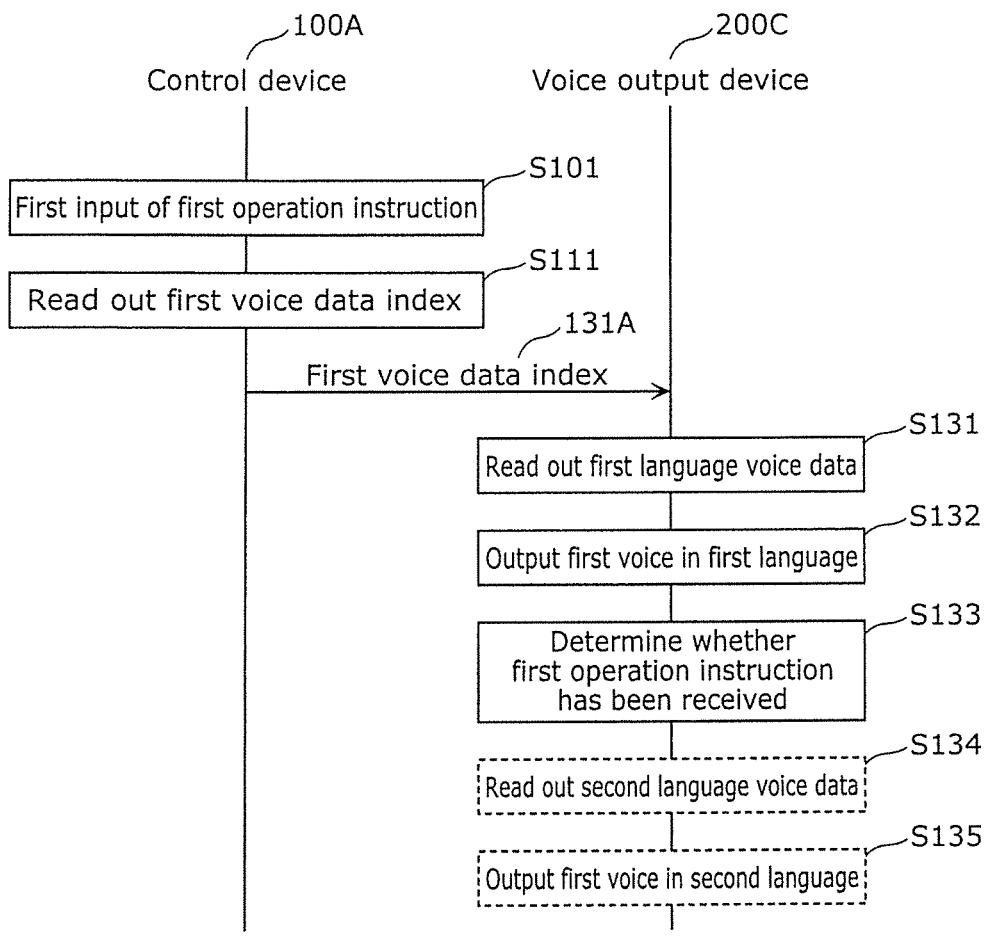
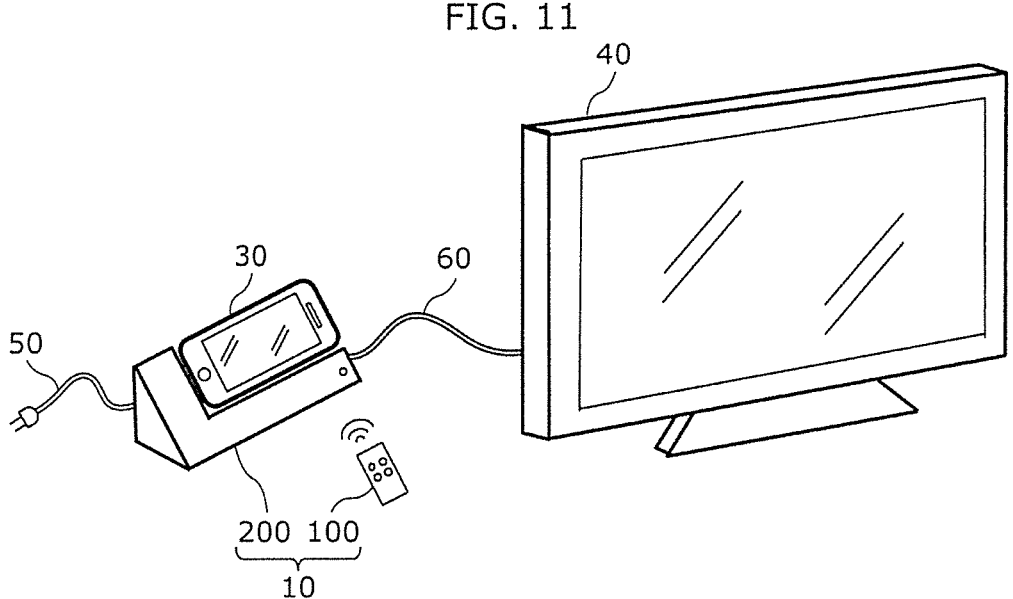

ELECTRONIC DEVICE CONTROLLING SYSTEM, VOICE OUTPUT DEVICE, AND METHODS THEREFOR

CROSS REFERENCE TO RELATED APPLICATION

This is a continuation application of PCT Patent Application No. PCT/JP2017/033360 filed on Sep. 14, 2017, designating the United States of America. The entire disclosure of the above-identified application, including the specification, drawings, and claims, is incorporated herein by reference in its entirety.

FIELD

The present disclosure relates to an electronic device controlling system, a voice output device, and methods for the electronic device controlling system and the voice output device for providing an instruction via voice for an operation of a speech recognition-capable electronic device.

BACKGROUND

Among electronic devices represented by recent information appliances, there is an electronic device that includes a natural language user interface. With a natural language user interface, an operator can operate an electronic device by talking to the electronic device as if the operator is talking to a person. Then, the electronic device understands the content of the operator's utterance and operates as instructed if that content indicates an instruction for an operation of the electronic device. It is conceivable that, from now on, there will be more and more such electronic devices with a natural language interface.

CITATION LIST

Patent Literature

PTL 1: Japanese Unexamined Patent Application Publication No. 2002-252884

SUMMARY

Technical Problem

In some cases, however, a natural language interface may fail to recognize an operator's utterance correctly, and the electronic device may thus fail to receive an operation instruction. For example, when there is a large distance between an operator and an electronic device or when an operator has difficulty speaking because of an injury or illness, the electronic device may have difficulty receiving an operation instruction by recognizing the operator's utterance correctly.

With some electronic devices, receiving an operation instruction via a voice input may offer a higher operation flexibility than receiving an operation instruction through a command transmission. In such a case, an operation instruction input via voice takes precedence over an operation instruction input through other forms of communication.

Accordingly, the present disclosure provides an electronic device controlling system, a voice output device, and methods for the electronic device controlling system and the voice output device that can improve the rate of success in providing an operation instruction to a speech recognition-capable electronic device via voice.

Solution to Problem

An electronic device controlling system according to one aspect of the present disclosure is an electronic device controlling system that provides an instruction via voice for an operation of a speech recognition-capable electronic device. The electronic device controlling system comprises: a control device; and a voice output device capable of communicating with the control device, wherein the control device includes: a first input unit that receives, from an operator, a first input to which a first operation instruction for the speech recognition-capable electronic device is assigned; and a transmitter that, when the first input unit receives the first input, transmits, to the voice output device, first information for communication corresponding to the first operation instruction assigned to the first input, and the voice output device includes: a receiver that receives the first information for communication from the control device; and an output unit that, when the receiver receives the first information for communication, outputs a first voice for the first operation instruction based on the first information for communication.

A voice output device according to another aspect of the present disclosure is a voice output device that outputs a voice recognizable to an electronic device. The voice output device comprises: a receiver that receives, from a control device that has received a first input for providing a first operation instruction to the electronic device from an operator, first information for communication corresponding to the first operation instruction; and an output unit that, when the receiver receives the first information for communication, outputs a first voice for the first operation instruction based on the first information for communication.

It is to be noted that these general or specific aspects may be implemented in the form of a method, an integrated circuit, a computer program, or a computer-readable recording medium, such as a CD-ROM, or may be implemented through any desired combination of a method, an integrated circuit, a computer program, and a recording medium.

Advantageous Effects

The present disclosure makes it possible to improve the rate of success in providing an operation instruction to a speech recognition-capable electronic device via voice.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 10 is a sequence diagram illustrating an operation of the electronic device controlling system according to Embodiment 4.

FIG. 11 illustrates an appearance of an electronic device controlling system according to Embodiment 5, an electronic device, and a display device.

DESCRIPTION OF EMBODIMENTS

Figure 1:
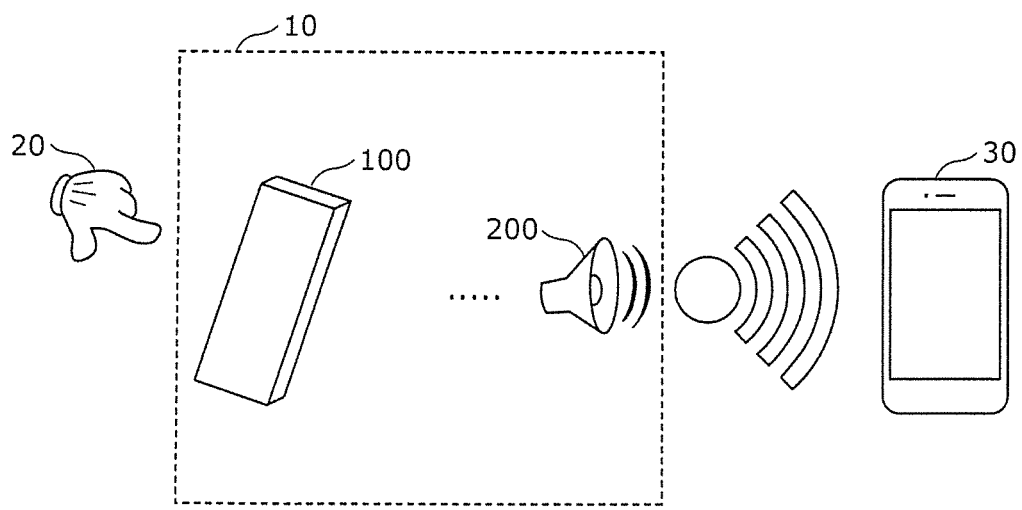
FIG. 1 illustrates an electronic device controlling system according to Embodiment 1, an operator, and an electronic device.

Hereinafter, embodiments of the present disclosure will be described in detail with reference to the drawings. The embodiments described below illustrate specific examples of the present disclosure. The numerical values, the shapes, the materials, the constituent elements, the arrangement of the constituent elements, the connection modes of the constituent elements, the use procedures, the communication procedures, and so on indicated in the following embodiments are examples and are not intended to limit the present disclosure. Among the constituent elements in the following embodiments, any constituent element that is not described in an independent claim expressing the broadest concept of the present disclosure is to be construed as an optional constituent element. Furthermore, the drawings do not necessarily provide the exact depictions. In the drawings, substantially identical components are given identical reference characters, and duplicate descriptions thereof will be omitted or simplified.

Embodiment 1

[Hardware Configuration of Electronic Device Controlling System]

First, with reference to FIG. 1, an example of a hardware configuration of an electronic device controlling system according to the present embodiment will be described in concrete terms. FIG. 1 illustrates an electronic device controlling system 10 according to Embodiment 1, an operator 20, and an electronic device 30.

The electronic device controlling system 10 provides an instruction for an operation of the electronic device 30 via voice. The electronic device controlling system 10 includes a control device 100 and a voice output device 200. The voice output device 200 can communicate with the control device 100.

In the descriptions, that an entity can communicate with the control device 100 means that the entity can at least receive data from the control device 100. There is no particular limitation on how the control device 100 and the voice output device 200 communicate with each other. The control device 100 and the voice output device 200 may communicate through either wired communication or wireless communication. The voice output device 200 communicates with the control device 100 through, for example, wireless infrared communication, Bluetooth (registered trademark), a wireless local area network (LAN), or the like.

The control device 100 operates the electronic device 30 via the voice output device 200. In the present embodiment, the control device 100 is a remote control device for the operator 20 to operate the electronic device 30 remotely. The control device 100 wirelessly transmits, to the voice output device 200, information for communication pertaining to an operation instruction. A detailed configuration of the control device 100 will be described later with reference to FIG. 2.

The voice output device 200 outputs a voice for providing an operation instruction to the electronic device 30 based on information for communication received from the control device 100.

The electronic device 30 is a speech recognition-capable device and includes a natural language user interface, for example. Specifically, the electronic device 30 is a smartphone or a tablet computer, for example. The electronic device 30 may also be a device having a voice user interface widely called a smart speaker (Amazon Echo (registered trademark), Google Home (registered trademark), Line Wave, Apple HomePod, etc.). The electronic device 30 may also be a speech recognition-capable remote controller. In other words, the electronic device 30 does not need to be an end target to be controlled. Speech recognition processing may be performed in the electronic device 30 or in a speech recognition server that can communicate with the electronic device 30.

[Hardware Configuration of Control Device]

Figure 2:
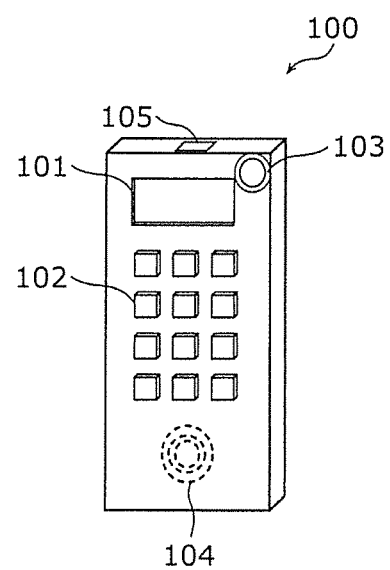
FIG. 2 is a perspective view of a control device according to Embodiment 1.

With reference to FIG. 2, a specific example of a hardware configuration of the control device 100 will now be described. FIG. 2 is a perspective view of the control device 100 according to Embodiment 1.

The control device 100 includes a touch panel 101, operation buttons 102, a camera 103, a microphone 104, and an infrared communication port 105. The touch panel 101, which is a touch screen, outputs information on a touch position. An operation instruction is assigned to each touch position. Therefore, the operator 20 can input an operation instruction by touching the touch panel 101.

The operation buttons 102 are each a mechanical button and each output an electric signal upon being pressed by the operator 20. An operation instruction is assigned to each operation button 102. Therefore, the operator 20 can input an operation instruction by pressing any one of the operation buttons 102.

The camera 103 captures an image of the operator 20 and outputs a video signal of the operator 20. A gesture of the operator is detected from this video signal. An operation instruction is assigned to each gesture. Therefore, the operator 20 can input an operation instruction by making a gesture.

The microphone 104 converts a voice of the operator 20 to an audio signal, which is an electric signal. An operation instruction is assigned to each audio signal. Therefore, the operator 20 can input an operation instruction by voice.

The infrared communication port 105 outputs infrared radiation to the voice output device 200 for data communication. Wireless infrared communication is used for communication in the present embodiment, but Bluetooth (registered trademark) or a wireless LAN may instead be used.

In such a case, the control device 100 may include an antenna or the like in place of the infrared communication port 105.

Although the control device 100 includes, as its user interfaces, the touch panel 101, the operation buttons 102, the camera 103, and the microphone 104, the control device 100 does not need to include all of the above. For example, the control device 100 may include at least one of the above. The control device 100 may also include another user interface. For example, the control device 100 may include a motion sensor (e.g., an acceleration sensor, an angular velocity sensor, etc.). This allows the operator 20 to input an operation instruction by moving the control device 100.

[Functional Configuration of Electronic Device Controlling System]

Figure 3:
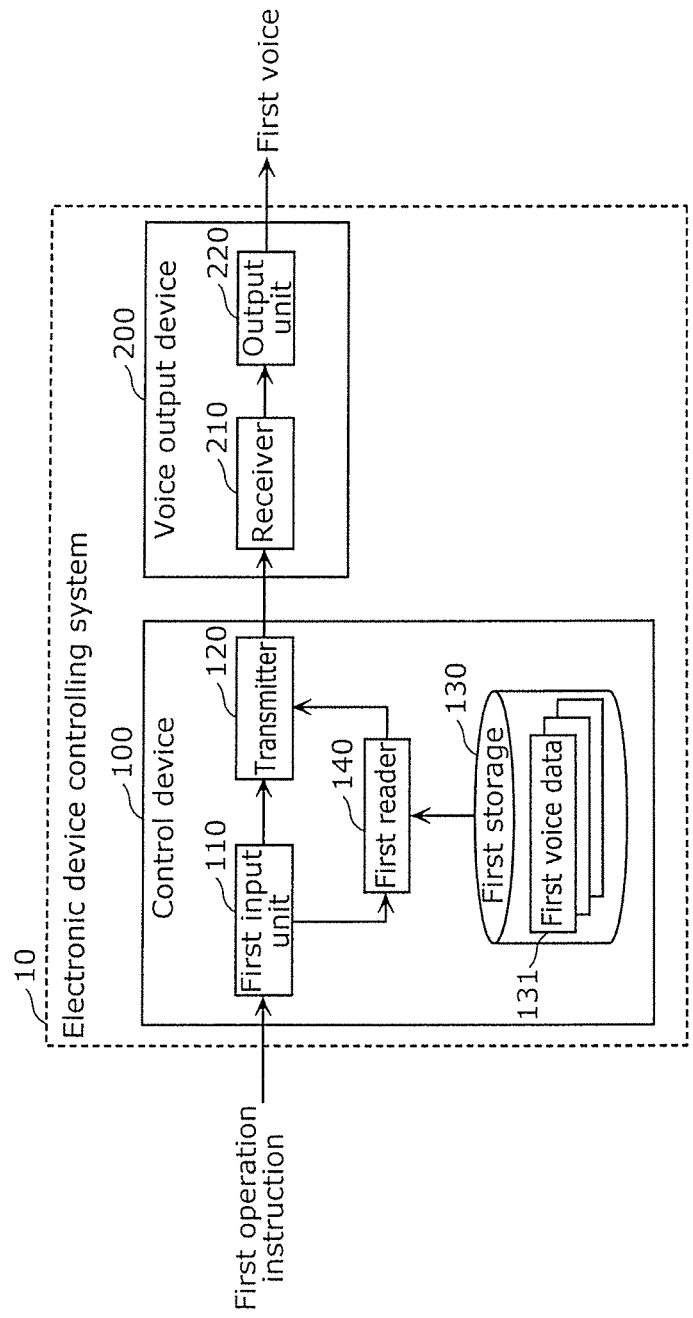
FIG. 3 is a block diagram illustrating a functional configuration of the electronic device controlling system according to Embodiment 1.

Now, with reference to FIG. 3, a functional configuration of the electronic device controlling system 10 configured as described above will be described. FIG. 3 is a block diagram illustrating a functional configuration of the electronic device controlling system according to Embodiment 1. The electronic device controlling system 10 includes the control device 100 and the voice output device 200.

[Functional Configuration of Control Device]

The control device 100 includes a first input unit 110, a transmitter 120, a first storage 130, and a first reader 140.

The first input unit 110 receives, from the operator 20, a first input to which a first operation instruction for the electronic device is assigned. The first input unit 110 is implemented, for example, by the touch panel 101, the operation buttons 102, the camera 103, the microphone 104, or any desired combination thereof.

A first operation instruction is an instruction that causes the electronic device 30 to perform a first operation. For example, a first operation instruction is an instruction that causes the electronic device 30 to play, stop, fast-forward, or rewind a video.

A first input is an input made by the operator 20 into a user interface. Specifically, a first input is, for example, pressing of an operation button to which a first operation instruction is assigned, touching of the touch panel at a position to which a first operation instruction is assigned, or the like.

When the first input unit 110 receives a first input, the transmitter 120 transmits, to the voice output device 200, first information for communication corresponding to a first operation instruction. The transmitter 120 transmits first information for communication to the voice output device 200 via the infrared communication port 105, for example. In the present embodiment, first information for communication is first voice data.

Voice data, upon being decoded, allows a voice to be played. In other words, a voice may be reconstructed with the use of voice data alone. Specifically, voice data is a digital audio file of a predetermined audio file format, for example. The predetermined audio file format may be an uncompressed audio format (e.g., WAV, AIFF, etc.) or a compressed audio format. The compressed audio format may be a lossless compressed audio format (e.g., FLAC, TAK, etc.) or a lossy compressed audio format (e.g., MP3, AAC, WMA, etc.).

The first storage 130 stores a plurality of pieces of first voice data associated with a plurality of first operation instructions. Herein, the plurality of pieces of first voice data are initial setting data prestored in the first storage 130. The first storage 130 is implemented, for example, by a semiconductor memory or a hard disk drive.

When the first input unit 110 receives a first input, the first reader 140 reads out, from the first storage 130, first voice data 131 corresponding to the first operation instruction assigned to the received first input. The first reader 140 is implemented, for example, by a dedicated electronic circuit or by a general-purpose processor and a memory.

Specifically, the first reader 140 reads out the first voice data 131 corresponding to the first operation instruction assigned to the first input among the plurality of pieces of first voice data stored in the first storage 130. The read-out first voice data 131 is transmitted to the voice output device 200 by the transmitter 120.

[Functional Configuration of Voice Output Device]

The voice output device 200 includes a receiver 210 and an output unit 220.

The receiver 210 receives first voice data 131 from the control device 100. The receiver 210 receives first voice data 131 via an infrared communication port (not illustrated), for example.

When the receiver 210 receives first voice data 131, the output unit 220 outputs a first voice for a first operation instruction based on the received first voice data 131. The output unit 220 is implemented, for example, by a loudspeaker (not illustrated).

This first voice is in a natural language, for example. The electronic device 30 can interpret a first voice and recognize a first operation instruction. Then, the electronic device 30 can perform a first operation in accordance with the recognized first operation instruction.

[Operation of Electronic Device Controlling System]

Figure 4:
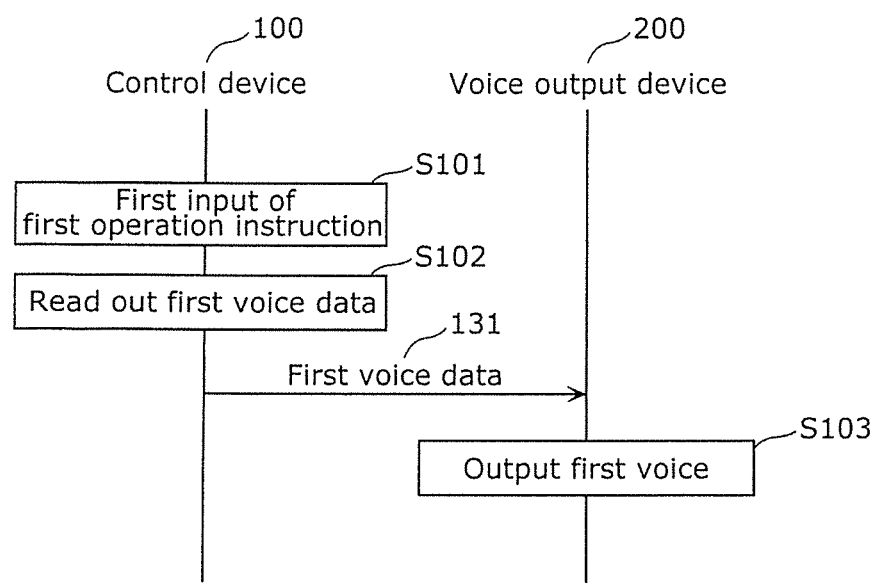
FIG. 4 is a sequence diagram illustrating an operation of the electronic device controlling system according to Embodiment 1.

Now, with reference to FIG. 4, an operation of the electronic device controlling system 10 configured as described above will be described in concrete terms. FIG. 4 is a sequence diagram illustrating an operation of the electronic device controlling system according to Embodiment 1.

The first input unit 110 of the control device 100 receives, from the operator 20, a first input to which a first operation instruction is assigned (S101). The first reader 140 of the control device 100 reads out, from the first storage 130, first voice data 131 corresponding to the first operation instruction assigned to the first input (S102). The transmitter 120 of the control device 100 transmits, to the voice output device 200, the first voice data 131 read out from the first storage 130.

The receiver 210 of the voice output device 200 receives the first voice data 131 from the control device 100. Then, the output unit 220 of the voice output device 200 outputs a first voice based on the received first voice data 131 (S103).

[Advantageous Effects and Others]

As described above, with the electronic device controlling system 10 according to the present embodiment, when the control device 100 receives, from the operator 20, a first input to which a first operation instruction for the electronic device 30 is assigned, the voice output device 200 can output a first voice for the first operation instruction. In other words, in the electronic device controlling system 10, the operator 20 can provide an instruction for an operation of the electronic device 30 via voice even without making a direct voice input into the electronic device 30. Accordingly, even when there is a large distance between the operator 20 and the electronic device 30, the rate of success in providing an operation instruction via voice can be improved as long as the voice output device 200 is disposed close to the electronic device 30. Furthermore, even when the operator 20 has difficulty speaking because of an injury or illness or even when the operator 20 is too shy to speak out loud, the operator 20 only needs to make a first input into the control device 100 and does not need to talk to the electronic device 30. This makes it possible to improve the rate of success in providing an operation instruction via voice.

Embodiment 2

Embodiment 2 will now be described. The present embodiment differs from Embodiment 1 described above in that, in place of first voice data, a first voice data index is used as first information for communication. An electronic device controlling system according to the present embodiment will be described below with the description centered on the differences from Embodiment 1 described above.

[Functional Configuration of Electronic Device Controlling System]

Figure 5:
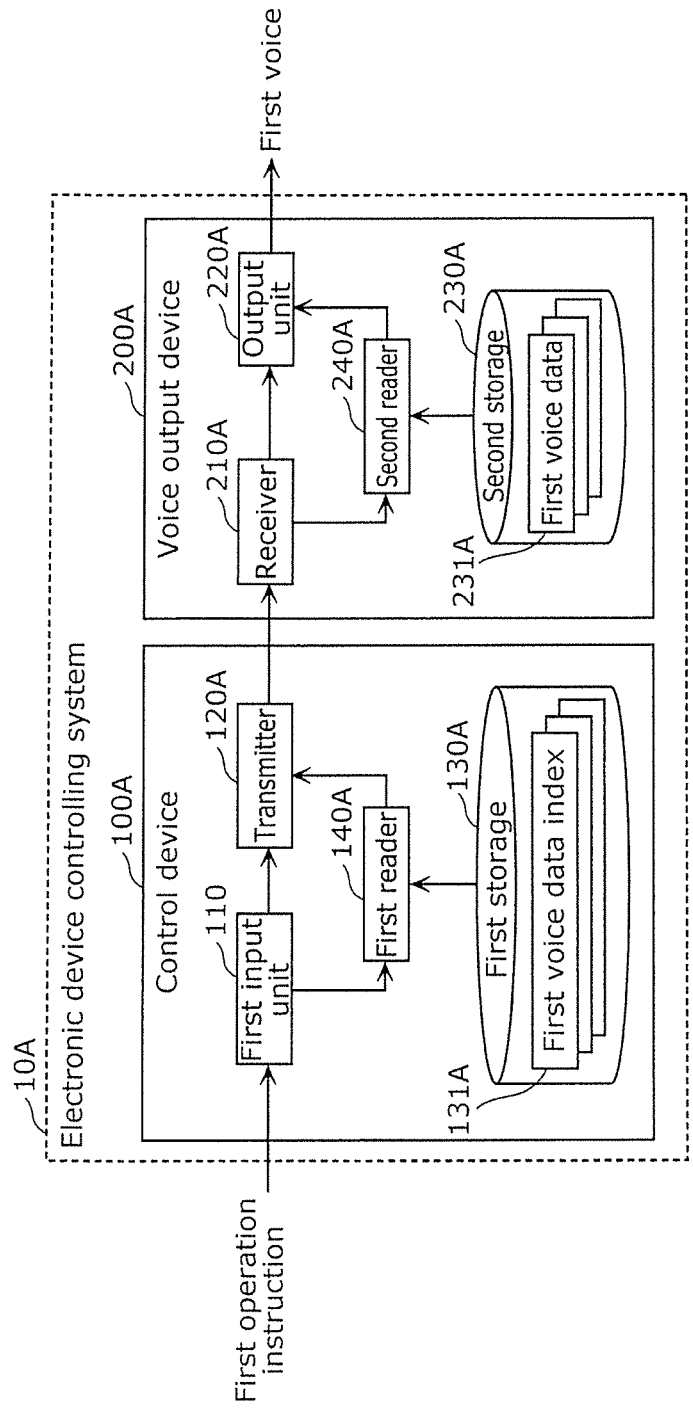
FIG. 5 is a block diagram illustrating a functional configuration of an electronic device controlling system according to Embodiment 2.

FIG. 5 is a block diagram illustrating a functional configuration of an electronic device controlling system 10A according to Embodiment 2. The electronic device controlling system 10A according to the present embodiment includes a control device 100A and a voice output device 200A.

[Functional Configuration of Control Device]

The control device 100A includes a first input unit 110, a transmitter 120A, a first storage 130A, and a first reader 140A.

When the first input unit 110 receives a first input, the transmitter 120A transmits, to the voice output device 200A, first information for communication corresponding to a first operation instruction. In the present embodiment, first information for communication is a first voice data index.

A voice data index is information for identifying voice data. For example, the file name of voice data can be used as a voice data index. A voice data index may be any piece of information that allows voice data to be identified. For example, when voice data is associated with an identifier of a first operation instruction or with an identifier of a first input in the voice output device 200A, a voice data index may be the identifier of the first operation instruction or the identifier of the first input.

The first storage 130A stores a plurality of first voice data indices associated with a plurality of first operation instructions.

When the first input unit 110 receives a first input, the first reader 140A reads out, from the first storage 130A, a first voice data index 131A corresponding to the first operation instruction assigned to the received first input. The read-out first voice data index 131A is transmitted to the voice output device 200A by the transmitter 120A.

[Functional Configuration of Voice Output Device]

The voice output device 200A includes a receiver 210A, an output unit 220A, a second storage 230A, and a second reader 240A.

The receiver 210A receives a first voice data index 131A from the control device 100A.

The second storage 230A stores a plurality of pieces of first voice data associated with a plurality of first voice data indices. The second storage 230A is implemented, for example, by a semiconductor memory or a hard disk drive.

The second reader 240A reads out, from the second storage 230A, first voice data 231A corresponding to a first voice data index 131A received by the receiver 210A. The second reader 240A is implemented, for example, by a dedicated electronic circuit or by a general-purpose processor and a memory.

The output unit 220A outputs a first voice for a first operation instruction based on first voice data 231A read out from the second storage 230A by the second reader 240A.

[Operation of Electronic Device Controlling System]

Figure 6:
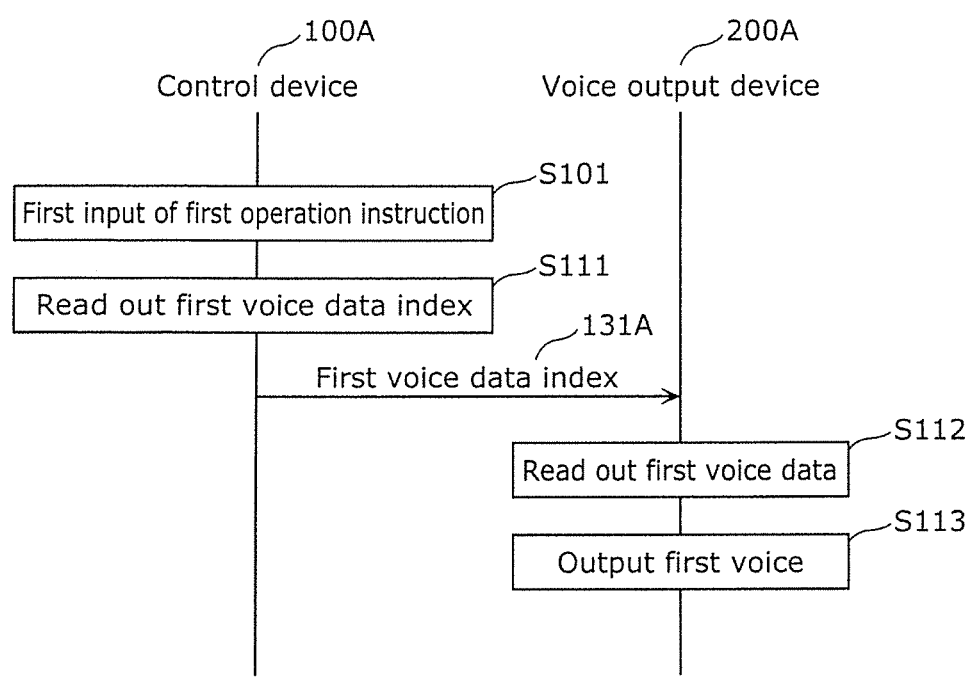
FIG. 6 is a sequence diagram illustrating an operation of the electronic device controlling system according to Embodiment 2.

Now, with reference to FIG. 6, an operation of the electronic device controlling system 10A configured as described above will be described in concrete terms. FIG. 6 is a sequence diagram illustrating an operation of the electronic device controlling system 10A according to Embodiment 2.

The first input unit 110 of the control device 100A receives, from an operator 20, a first input to which a first operation instruction is assigned (S101). The first reader 140A of the control device 100A reads out, from the first storage 130A, a first voice data index 131A corresponding to the first operation instruction assigned to the received first input (S111). The transmitter 120A of the control device 100A transmits, to the voice output device 200A, the first voice data index 131A read out from the first storage 130A.

The receiver 210A of the voice output device 200A receives the first voice data index 131A from the control device 100A. Then, the second reader 240A of the voice output device 200A reads out, from the second storage 230A, first voice data 231A corresponding to the received first voice data index 131A (S112). The output unit 220A of the voice output device 200A outputs a first voice based on the read-out first voice data 231A (S113).

[Advantageous Effects and Others]

As described above, with the electronic device controlling system 10A according to the present embodiment, a first voice data index can be used as first information for communication to be transmitted from the control device 100A to the voice output device 200A. Accordingly, the traffic can be reduced as compared to a case where first voice data is transmitted. Furthermore, the present embodiment facilitates the use of an existing remote control as the control device 100A.

Embodiment 3

Embodiment 3 will now be described. The present embodiment differs from Embodiments 1 and 2 described above in that an operator can register new voice data into a first storage. An electronic device controlling system according to the present embodiment will be described below with the description centered on the differences from Embodiments 1 and 2 described above.

[Functional Configuration of Electronic Device Controlling System]

Figure 7:
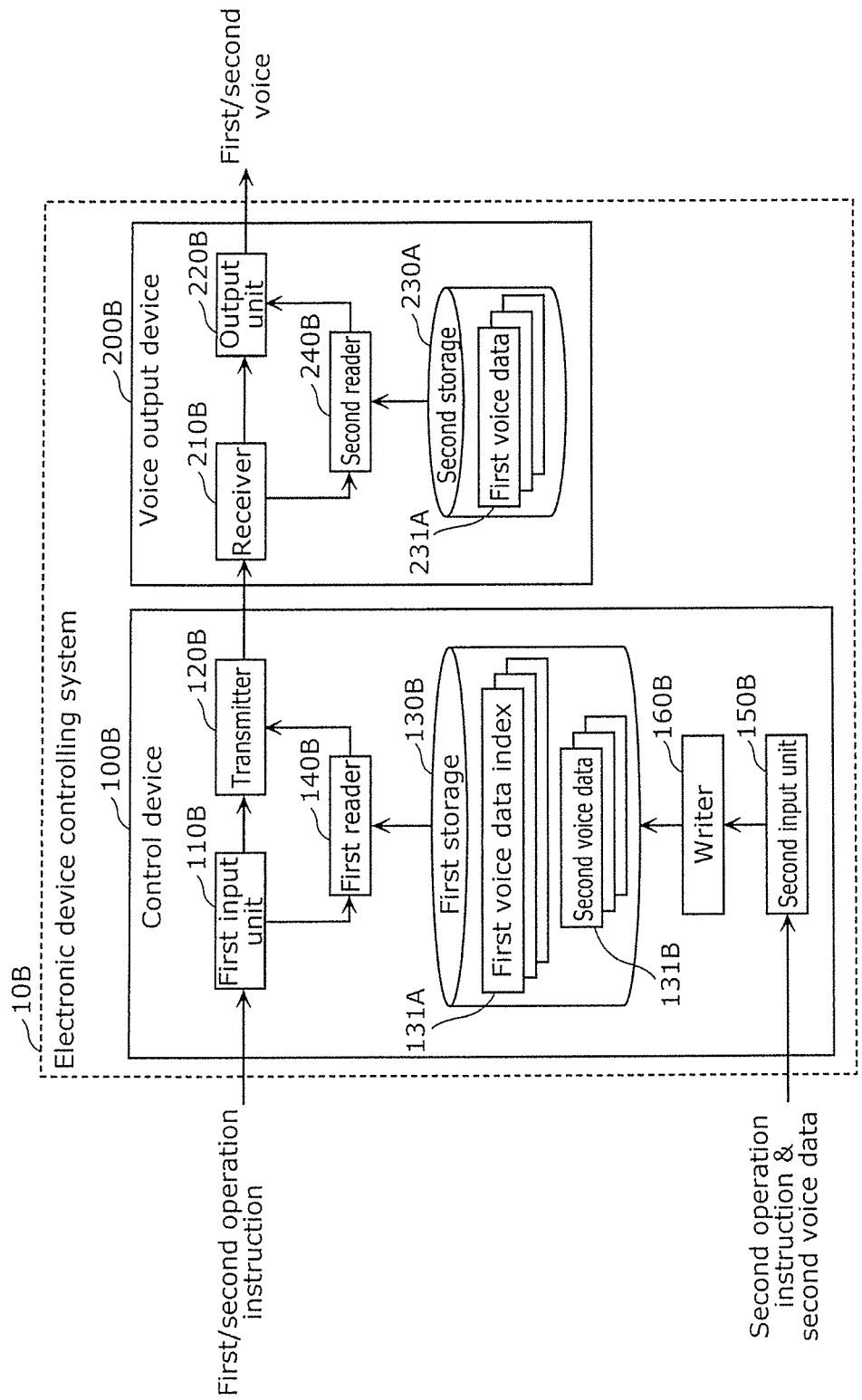
FIG. 7 is a block diagram illustrating a functional configuration of an electronic device controlling system according to Embodiment 3.

FIG. 7 is a block diagram illustrating a functional configuration of an electronic device controlling system 10B according to Embodiment 3. The electronic device controlling system 10B according to the present embodiment includes a control device 100B and a voice output device 200B.

[Functional Configuration of Control Device]

The control device 100B includes a first input unit 110B, a transmitter 120B, a first storage 130B, a first reader 140B, a second input unit 150B, and a writer 160B.

The second input unit 150B receives, from an operator 20, an input of a second operation instruction for an electronic device 30 and an input of second voice data corresponding to the second operation instruction. The second input unit 150B is implemented, for example, by a touch panel 101, operation buttons 102, a camera 103, a microphone 104, or any desired combination thereof.

A second operation instruction is an instruction that causes the electronic device 30 to perform a second operation and that is registered newly into the control device 100B by the operator 20. For example, a second operation instruction is an instruction that causes the electronic device 30 to play a video in trick mode (e.g., 30-second skipping).

When the second input unit 150B receives an input of a second operation instruction and an input of second voice data 131B, the writer 160B writes, into the first storage 130B, the received second voice data 131B associated with the second operation instruction.

The first storage 130B stores a plurality of first voice data indices associated with a plurality of first operation instructions. In addition, the first storage 130B stores second voice data written by the writer 160B with the second voice data associated with a second operation instruction.

The first input unit 110B receives, from the operator 20, a first input to which a first operation instruction is assigned and a second input to which a second operation instruction is assigned.

A second input is an input into a user interface, and a second operation instruction is being assigned to the second input by the operator 20 via the second input unit 150B. Specifically, a second input is, for example, pressing of an operation button to which a second operation instruction is assigned by the operator 20, touching of a touch panel at a position to which a second operation instruction is assigned by the operator 20, or the like.

When the first input unit 110B receives a first input, the first reader 140B reads out, from the first storage 130B, a first voice data index 131A corresponding to a first operation instruction assigned to the received first input. Meanwhile, when the first input unit 110B receives a second input, the first reader 140B reads out, from the first storage 130B, second voice data 131B corresponding to a second operation instruction assigned to the received second input.

The transmitter 120B transmits, to the voice output device 200B, first information for communication corresponding to a first operation instruction or second information for communication corresponding to a second operation instruction. Herein, first information for communication is a first voice data index 131A, and second information for communication is second voice data 131B. Therefore, the transmitter 120B transmits, to the voice output device 200B, a first voice data index 131A or second voice data 131B read out by the first reader 140B.

[Functional Configuration of Voice Output Device]

The voice output device 200B includes a receiver 210B, an output unit 220B, a second storage 230A, and a second reader 240B.

The receiver 210B receives, from the control device 100, a first voice data index 131A or second voice data 131B.

The second reader 240B determines which of a first voice data index 131A and second voice data 131B the receiver 210B has received.

If the receiver 210B receives a first voice data index 131A, the second reader 240B reads out, from the second storage 230A, first voice data 231A corresponding to the received first voice data index 131A. Then, the output unit 220B outputs a first voice for a first operation instruction based on the first voice data 231A read out from the second reader 240B.

Meanwhile, if the receiver 210B receives second voice data 131B, the output unit 220B outputs a second voice for a second operation instruction based on the received second voice data 131B. At this point, the second reader 240B does not need to read out any first voice data 231A from the second storage 230A.

A second voice is in a natural language, for example. The electronic device 30 can interpret a second voice and recognize a second operation instruction. Then, the electronic device 30 can perform a second operation in accordance with the recognized second operation instruction.

[Operation of Electronic Device Controlling System]

Figure 8:
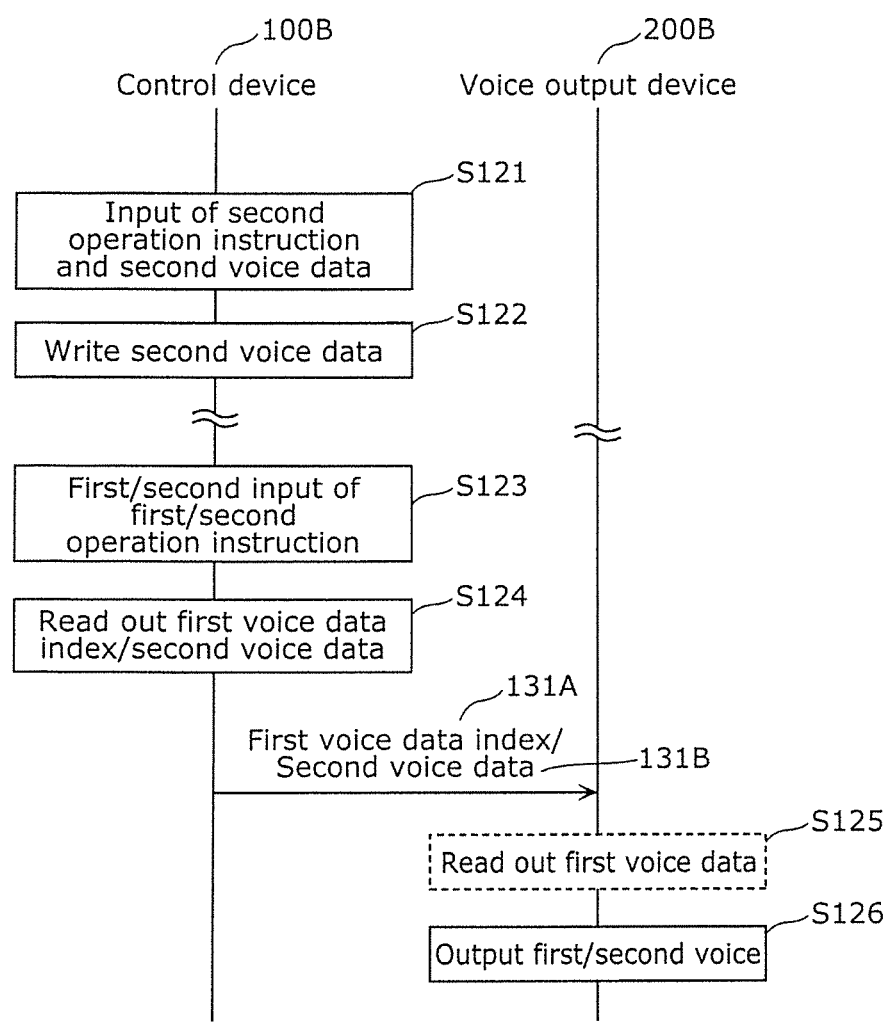
FIG. 8 is a sequence diagram illustrating an operation of the electronic device controlling system according to Embodiment 3.

Now, with reference to FIG. 8, an operation of the electronic device controlling system 10B configured as described above will be described in concrete terms. FIG. 8 is a sequence diagram illustrating an operation of the electronic device controlling system 10B according to Embodiment 3.

The second input unit 150B of the control device 100B receives, from the operator 20, an input of a second operation instruction for the electronic device 30 and an input of second voice data 131B corresponding to the second operation instruction (S121). For example, the operator 20 inputs a second voice for a second operation instruction into the microphone 104 while pressing an operation button 102 for assigning the second operation instruction.

When the second input unit 150B receives an input of the second operation instruction and an input of the second voice data 131B, the writer 160B of the control device 100B writes, into the first storage 130B, the second voice data 131B associated with the second operation instruction (S122).

Thereafter, the first input unit 110B of the control device 100B receives, from the operator 20, a first input to which a first operation instruction is assigned and a second input to which a second operation instruction is assigned (S123).

The first reader 140B of the control device 100B reads out, from the first storage 130B, a first voice data index 131A corresponding to the first operation instruction or second voice data 131B corresponding to the second operation instruction (S124). Specifically, if the first input unit 110B receives the first input, the first reader 140B reads out a first voice data index 131A corresponding to the first operation instruction assigned to the received first input. Meanwhile, if the first input unit 110B receives the second input, the first reader 140B reads out second voice data 131B corresponding to the second operation instruction assigned to the received second input.

The first voice data index 131A or the second voice data 131B read out by the first reader 140B is transmitted to the voice output device 200B via the transmitter 120B.

The second reader 240B of the voice output device 200B determines which of the first voice data index 131A and the second voice data 131B the receiver 210B has received. If the receiver 210B receives the first voice data index 131A, the second reader 240B reads out, from the second storage 230A, first voice data 231A corresponding to the received first voice data index 131A (S125). This step S125 is shown in a dashed line since this step is skipped if the receiver 210B receives second voice data.

The output unit 220B of the voice output device 200B outputs a first voice for the first operation instruction or a second voice for the second operation instruction (S126). Specifically, if the receiver 210B receives the first voice data index 131A, the output unit 220B outputs a first voice based on the first voice data 231A read out by the second reader 240B. Meanwhile, if the receiver 210B receives the second voice data 131B, the output unit 220B outputs a second voice based on the received second voice data 131B.

Advantageous Effects and Others

As described above, with the electronic device controlling system 10B according to the present embodiment, a first voice data index can be used as first information for communication to be prestored in the control device 100B.

Furthermore, second voice data can be used as second information for communication to be registered newly in the control device 100B. Therefore, the operator 20 can input second voice data corresponding to a second operation instruction with the control device 100B. In other words, the control device 100B can acquire second voice data by recording the voice of the operator 20, for example. Accordingly, the operator does not need to input second voice data into the voice output device 200, and this can provide improved user-friendliness for the operator 20. Furthermore, for first information for communication, not first voice data but a first voice data index can be transmitted, and this can reduce the traffic.

In the present embodiment, a first voice data index 131A or second voice data 131B is transmitted as first information for communication or second information for communication from the control device 100B to the voice output device 200B. First information for communication and second information for communication, however, are not limited to the above.

For example, first information for communication and second information for communication may each be voice data. In this case, the voice output device 200B does not need to include the second reader 240B and the second storage 230A. Accordingly, the configuration of the voice output device 200B can be simplified.

In addition, for example, first information for communication and second information for communication may each be a voice data index. In this case, the second storage 230A of the voice output device 200B may further store second voice data associated with a second voice data index. Then, when the receiver 210B receives a second voice data index as second information for communication, the second reader 240B may read out, from the second storage 230A, second voice data corresponding to the received second voice data index. This makes it possible to further reduce the traffic from the control device 100B to the voice output device 200B.

Embodiment 4

Embodiment 4 will now be described. The present embodiment differs from the embodiments described above in that, when an electronic device fails to receive a voice input, the language of the voice can be changed. An electronic device controlling system according to the present embodiment will be described below with the description centered on the differences from the embodiments described above.

[Functional Configuration of Electronic Device Controlling System]

Figure 9:
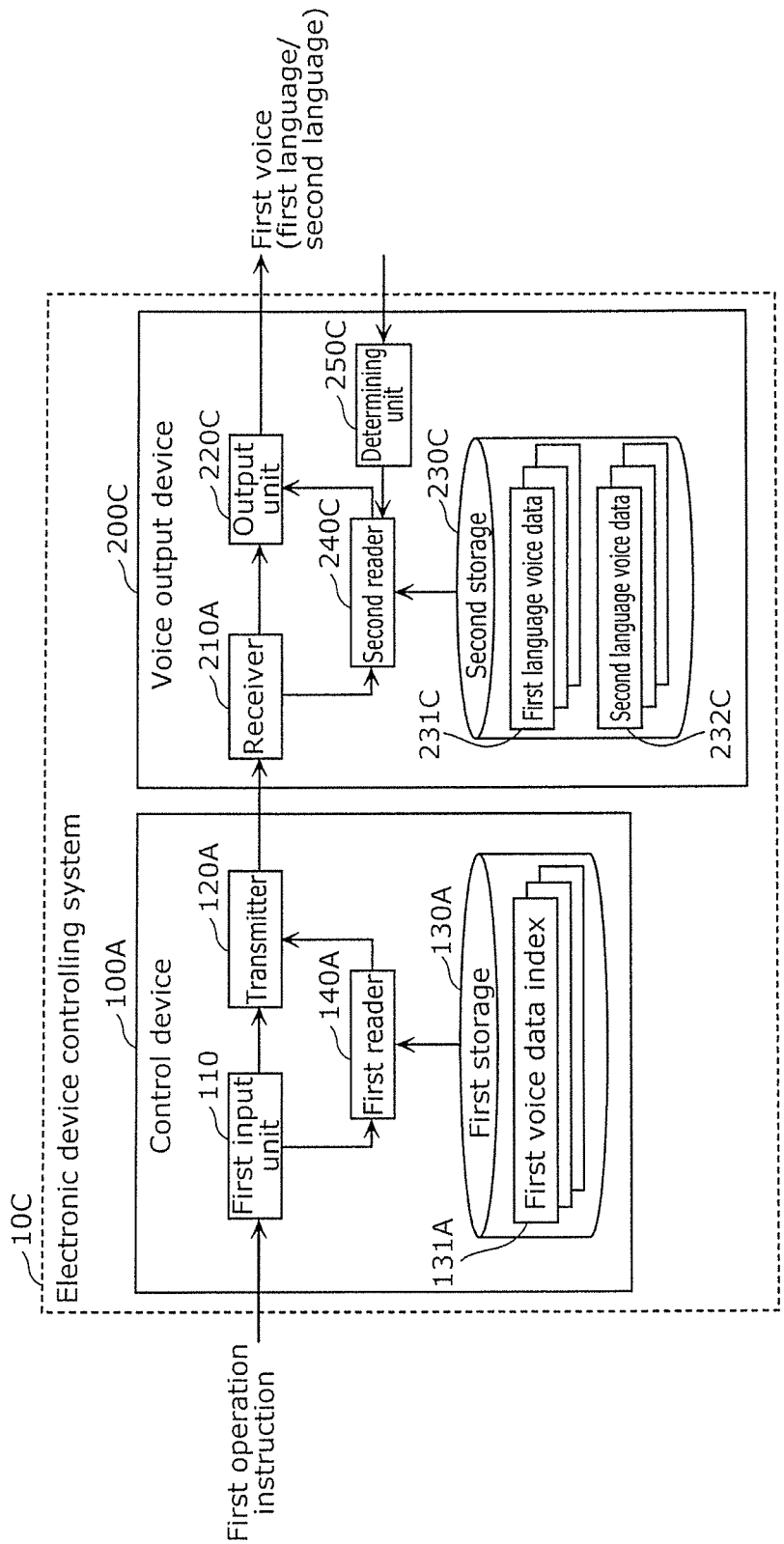
FIG. 9 is a block diagram illustrating a functional configuration of an electronic device controlling system according to Embodiment 4.

FIG. 9 is a block diagram illustrating a functional configuration of an electronic device controlling system 10C according to Embodiment 4. The electronic device controlling system 10C according to the present embodiment includes a control device 100A and a voice output device 200C.

[Functional Configuration of Voice Output Device]

The voice output device 200C includes a receiver 210A, an output unit 220C, a second storage 230C, a second reader 240C, and a determining unit 250C.

The second storage 230C stores a plurality of pieces of first language voice data and a plurality of pieces of second language voice data associated with a plurality of first voice data indices.

First language voice data is data of a voice uttered in a first language. A first language is any preset language. A first language is, for example, Japanese. It is to be noted that a first language does not mean a native language of an operator 20. Therefore, a first language may be a language other than a native language of the operator 20.

Second language voice data is data of a voice uttered in a second language. A second language is a language different from a first language. A second language is, for example, English. It is to be noted that a second language does not mean a language other than a native language that the operator 20 can use. Therefore, a second language may be a language that the operator 20 cannot use.

The second reader 240C reads out, from the second storage 230C, first language voice data 231C corresponding to a first voice data index 131A received by the receiver 210A.

The output unit 220C outputs a first voice for a first operation instruction in a first language based on first language voice data 231C read out from the second storage 230C by the second reader 240C.

The determining unit 250C determines whether the electronic device 30 has received a first operation instruction via a first voice in a first language. The determining unit 250C is implemented, for example, by a dedicated electronic circuit or by a general-purpose processor and a memory.

Specifically, the determining unit 250C determines whether a first operation instruction has been received by detecting a voice output by the electronic device 30 indicating receipt/failed receipt of the first operation instruction, for example. The voice indicating receipt of the first operation instruction says, for example, "I will do a first operation" or the like. The voice indicating failed receipt of the first operation instruction says, for example, "I'm sorry. I didn't quite understand" or the like. These are examples of the voice indicating receipt/failed receipt, and these are not limiting examples. Furthermore, information to be used to make a determination as to receipt/failed receipt is not limited to a voice output from the electronic device 30. For example, the determining unit 250C may receive notification data indicating receipt/failed receipt from the electronic device 30 and make a determination based on the received notification data.

When the determining unit 250C determines that the electronic device 30 has failed to receive a first operation instruction via a first voice in a first language, the second reader 240C reads out, from the second storage 230C, second language voice data 232C corresponding to the first voice data index 131A. Then, the output unit 220C outputs the first voice for the first operation instruction in a second language based on the second language voice data 232C read out from the second storage 230C by the second reader 240C.

[Operation of Electronic Device Controlling System]

Now, with reference to FIG. 10, an operation of the electronic device controlling system 10C configured as described above will be described in concrete terms. FIG. 10 is a sequence diagram illustrating an operation of the electronic device controlling system 10C according to Embodiment 4.

The second reader 240C of the voice output device 200C reads out, from the second storage 230C, first language voice data 231C corresponding to the first voice data index 131A received from the control device 100A (S131). Then, the output unit 220C of the voice output device 200C outputs a first voice for a first operation instruction in a first language based on the read-out first language voice data 231C (S132).

The determining unit 250C determines whether the electronic device 30 has received the first operation instruction via the first voice in the first language (S133). When the determining unit 250C determines that the electronic device 30 has failed to receive the first operation instruction in the first language, the second reader 240C reads out, from the second storage 230C, second language voice data 232C corresponding to the first voice data index 131A (S134). Then, the output unit 220C outputs the first voice for the first operation instruction in a second language based on the read-out second language voice data 232C (S135).

Meanwhile, when the determining unit 250C determines that the electronic device 30 has received the first operation instruction via the first voice in the first language, steps S134 and S135 are skipped.

Advantageous Effects and Others

As described above, with the electronic device controlling system 10C according to the present embodiment, when it is determined that the electronic device 30 has failed to receive a first operation instruction via a first voice in a first language, the first voice can be output in a second language different from the first language. Accordingly, the language of a first voice can be switched when the first voice is output in a language that the electronic device cannot recognize or cannot receive, and the rate of success in providing a first operation instruction can be improved.

In the present embodiment, the voice output device 200C holds second language voice data associated with a first voice data index. Alternatively, second language voice data may be acquired from another device. For example, when a first operation instruction via a first voice in a first language fails to be received, the voice output device 200C may transmit first language voice data to an automated translation server. Then, the voice output device 200C may receive, from the automated translation server, second language voice data as a translation result of the first language voice data.

Embodiment 5

Embodiment 5 will now be described. In the present embodiment, a specific example of the voice output device 200 in the foregoing embodiments will be described.

[Hardware Configuration of Voice Output Device]

Figure 12A:
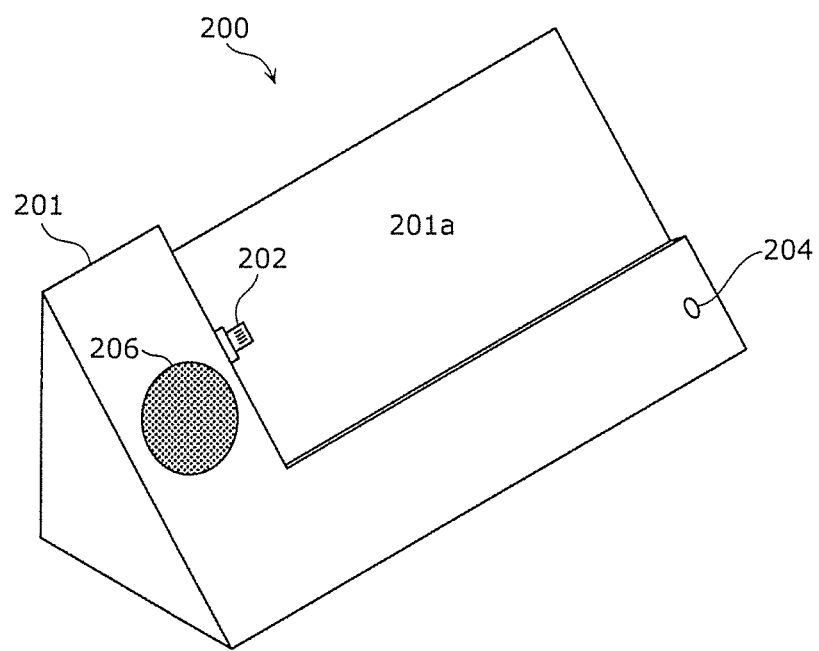
FIG. 12A is a front perspective view of a voice output device according to Embodiment 5.
Figure 12B:
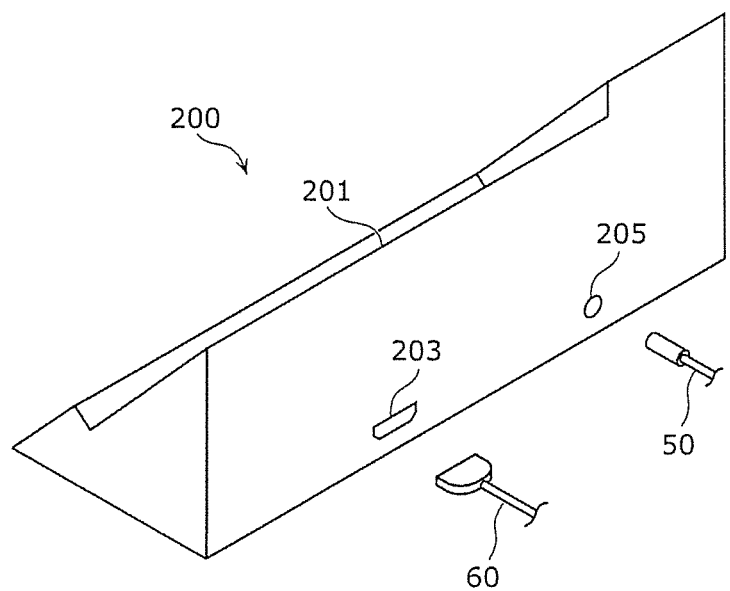
FIG. 12B is a rear perspective view of the voice output device according to Embodiment 5.

With reference to FIGS. 11 to 12B, a specific example of a voice output device 200 will be described. FIG. 11 illustrates an appearance of an electronic device controlling system 10 according to Embodiment 5, an electronic device 30, and a display device 40. FIG. 12A is a front perspective view of the voice output device 200 according to Embodiment 5. FIG. 12B is a rear perspective view of the voice output device 200 according to Embodiment 5.

The electronic device 30 is a mobile information terminal having a rectangular screen. For example, the electronic device 30 is a smartphone, a tablet computer, or the like that connects to the internet or a telephone network for communication or executes various applications (software programs).

The display device 40 includes a screen and a loudspeaker. The display device 40 displays a video on the screen or outputs a sound through the loudspeaker based on an audio and video signal input from the voice output device 200.

The voice output device 200 is a table-top cradle or docking station that removably holds the electronic device 30. The voice output device 200 relays, to the display device 40, an audio and video signal output from the electronic device 30 having a rectangular screen.

As illustrated in FIGS. 12A and 12B, the voice output device 200 includes a casing 201, a connector 202, an external interface 203, an infrared communication port 204, a power supply terminal 205, and a loudspeaker 206.

The casing 201 has a generally triangular prism shape. The casing 201 includes a holding portion 201a for holding the electronic device 30 on a front surface corresponding to one side surface of the triangular prism. The casing 201 is formed by a molded resin, for example. Housed inside the casing 201 is a control circuit (not illustrated) or a processor and memory (neither illustrated), which functions as a second reader and so on according to the foregoing embodiments.

The connector 202 is provided in the casing 201 and is directly connected to the electronic device 30 with no cable involved therebetween. Herein, the connector 202 is a connection terminal to be directly plugged into a dedicated connector (e.g., a lightning connector, a universal serial bus (USB), etc.) for charging and communication included in the electronic device 30. The voice output device 200 supplies power to the electronic device 30 via the connector 202. In addition, the voice output device 200 receives an audio and video signal from the electronic device 30 via the connector 202.

The external interface 203 is provided in the casing 201 and is connected to the display device 40. Specifically, the external interface 203 is a communication interface (e.g., High-Definition Multimedia Interface (HDMI) (registered trademark)) for transmitting an audio and video signal. A communication cable 60 is connected to the external interface 203.

The infrared communication port 204 receives information for communication from a control device 100 via infrared radiation.

The power supply terminal 205 is a female connector that is to receive a power source cord 50, such as an AC-DC adapter or an AC power source cable. The power source cord 50 is connected to the commercial power source.

The loudspeaker 206 outputs a first voice for a first operation instruction or a second voice for a second operation instruction based on a signal from a control circuit. In other words, the loudspeaker 206 functions as an output unit according to the foregoing embodiments.

The voice output device 200 receives an audio and video signal from the electronic device 30 via the connector 202 in the present embodiment, but this is not a limiting example. In other words, the voice output device 200 does not need to receive an audio and video signal from the electronic device 30 via the connector 202.

Other Embodiments

Thus far, electronic device controlling systems according to one or more aspects of the present disclosure have been described based on the embodiments, but the present disclosure is not limited to these embodiments. Unless departing from the spirit of the present disclosure, an embodiment obtained by making various modifications that are conceivable by a person skilled in the art to the present embodiments or an embodiment constructed by combining the constituent elements in different embodiments may also be included within the scope of the one or more aspects of the present disclosure.

For example, Embodiment 3 and Embodiment 4 may be combined. In this case, the electronic device controlling system 10C according to Embodiment 4 may include the control device 100B in place of the control device 100A.

In the foregoing embodiments, a first storage is included in a control device, but this is not a limiting example. For example, a first storage may be included in an external storage device connected to a control device. In Embodiments 2 to 4, a second storage is included in a voice output device, but this is not a limiting example. For example, a second storage may be included in an external storage device connected to a voice output device.

In the foregoing embodiments, an electronic device 30 includes a natural language interface, but a voice interface is not limited to a natural language interface. For example, an electronic device 30 may include a voice interface that receives a keyword input.

A part or whole of the constituent elements included in a control device or a voice output device according to the foregoing embodiments may be constituted by a single large-scale integration (LSI). For example, a control device 100 may be constituted by a system LSI including a first reader 140.

A system LSI is an ultra-multifunctional LSI manufactured by integrating a plurality of components into a single chip and is specifically a computer system including a microprocessor, a read-only memory (ROM), a random-access memory (RAM), and so on. The ROM stores a computer program. As the microprocessor operates in accordance with the computer program, the system LSI implements its functions.

Although a system LSI is illustrated above, depending on the difference in the degree of integration, it may also be called an IC, an LSI, a super LSI, or an ultra LSI. The technique for circuit integration is not limited to LSI, and an integrated circuit may be implemented by a dedicated circuit or a general-purpose processor. A field-programmable gate array (FPGA) that can be programmed after an LSI has been manufactured or a reconfigurable processor in which the connection or the setting of the circuit cells within the LSI can be reconfigured may also be used.

Furthermore, if a technique for circuit integration that replaces LSI becomes available through the advancement in the semiconductor technology or a derived different technique, functional blocks may be integrated with the use of such a different technique. An application of biotechnology, for example, is a possibility.

An aspect of the present disclosure is not limited to an electronic device controlling system but may instead be a voice output device included in an electronic device controlling system. Furthermore, an aspect may be an electronic device controlling method or a voice output method including, in the forms of steps, characteristic constituent elements included in an electronic device controlling system or a voice output device. An aspect of the present disclosure may also be a computer program that causes a computer to execute each characteristic step included in a voice output method. An aspect of the present disclosure may also be a non-transitory computer-readable recording medium having such a computer program recorded therein.

In the foregoing embodiments, the constituent elements may each be implemented by dedicated hardware or may each be implemented through execution of a software program suitable for a corresponding constituent element. Each of the constituent elements may be implemented as a program executing unit, such as a central processing unit (CPU) or a processor, reads out a software program recorded in a recording medium, such as a hard disk or a semiconductor memory, and executes the software program. Software that implements a voice output device and so on in the foregoing embodiments is a program such as the one described below.

Specifically, this program is a voice output method that causes a computer to output a voice that an electronic device can recognize. The voice output method includes receiving, from a control device that has received a first input for causing the electronic device to perform a first operation instruction from an operator, first information for communication corresponding to the first operation instruction; and outputting, in response to receiving the first information for communication, a first voice for the first operation instruction based on the first information for communication.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used for an electronic device controlling system or a voice output device that provides an instruction via voice for an operation of a speech recognition-capable electronic device.

The invention claimed is:

1. An electronic device controlling system that provides an instruction via voice for an operation of a speech recognition-capable electronic device, the electronic device controlling system comprising:
 a control device; and
 a voice output device for communicating with the control device, wherein:
 the control device includes:
  a first input unit that receives a first input by an operator, to which a first operation instruction for the speech recognition-capable electronic device is assigned, the first input being other than operator's voice; and
  a transmitter that, when the first input unit receives the first input, transmits, to the voice output device, first information for communication corresponding to the first operation instruction assigned to the first input,
 the voice output device includes:
  a receiver that receives the first information for communication from the control device; and
  an output unit that, when the receiver receives the first information for communication, outputs a first voice for the first operation instruction based on the first information for communication,
 the control device further includes:
  a first storage that stores a plurality of pieces of first information for communication associated with a plurality of first operation instructions; and
  a first reader that, when the first input unit receives the first input, reads out, from the first storage, the first information for communication corresponding to the first operation instruction assigned to the first input,
 the control device further includes:
  a second input unit that receives, from the operator, an input of a second operation instruction for the speech recognition-capable electronic device and an input of second information for communication corresponding to the second operation instruction; and a writer that, when the second input unit receives the input of the second operation instruction and the input of the second information for communication, writes, into the first storage, the second information for communication associated with the second operation instruction, the first input unit further receives, from the operator, a second input to which the second operation instruction is assigned, when the first input unit receives the second input,
(i) the first reader reads out, from the first storage, the second information for communication corresponding to the second operation instruction, and
(ii) the transmitter transmits, to the voice output device, the second information for communication read out by the first reader, the receiver further receives the second information for communication from the control device, and the output unit, when the receiver receives the second information for communication, outputs a second voice for the second operation instruction based on the second information for communication.

2. The electronic device controlling system according to claim 1, wherein
the first information for communication and the second information for communication are each voice data.

3. The electronic device controlling system according to claim 1, wherein
the first information for communication and the second information for communication are each a voice data index,
the voice output device further includes:
a second storage that stores a plurality of pieces of voice data associated with a plurality of voice data indices; and
a second reader that reads out, from the second storage, voice data corresponding to the first information for communication or the second information for communication, and
the output unit outputs the first voice or the second voice based on the voice data read out by the second reader.

4. The electronic device controlling system according to claim 1, wherein
the first information for communication is a first voice data index,
the second information for communication is second voice data,
the voice output device further includes:
a second storage that stores a plurality of pieces of first voice data associated with a plurality of first voice data indices; and
a second reader that, when the receiver receives the first information for communication, reads out, from the second storage, first voice data corresponding to the first voice data index serving as the first information for communication, and
the output unit,
(i) when the receiver receives the first information for communication, outputs the first voice based on the first voice data read out by the second reader, or
(ii) when the receiver receives the second information for communication, outputs the second voice based on the second voice data serving as the second information for communication.

5. The electronic device controlling system according to claim 1, wherein:
the output unit outputs the first voice in a first language,
the voice output device further includes a determining unit that determines whether the speech recognition-capable electronic device has received the first operation instruction via the first voice in the first language, and
the output unit, when it is determined that the speech recognition-capable electronic device has failed to receive the first operation instruction via the first voice in the first language, outputs the first voice in a second language different from the first language.

6. The electronic device controlling system according to claim 1, wherein
the first input unit includes at least one of a touch panel, an operation button, a camera, or a microphone.

7. The electronic device controlling system according to claim 1, wherein
the voice output device further includes:
a casing that removably holds the speech recognition-capable electronic device;
a connector that is connected to the speech recognition-capable electronic device held in the casing and that supplies power to the speech recognition-capable electronic device; and
a loudspeaker that functions as the output unit.

8. The electronic device controlling system according to claim 7, wherein
the voice output device further includes an external interface to be connected to a display device, and
the voice output device:
receives an audio and video signal from the speech recognition-capable electronic device via the connector; and
outputs the audio and video signal to the display device via the external interface.

9. An electronic device controlling system that provides an instruction via voice for an operation of a speech recognition-capable electronic device, the electronic device controlling system comprising:
a control device; and
a voice output device for communicating with the control device, wherein:
the control device includes:
a first input unit that receives a first input by an operator, to which a first operation instruction for the speech recognition-capable electronic device is assigned; and
a transmitter that, when the first input unit receives the first input, transmits, to the voice output device, first information for communication corresponding to the first operation instruction assigned to the first input,
the voice output device includes:
a receiver that receives the first information for communication from the control device; and
an output unit that, when the receiver receives the first information for communication, outputs a first voice for the first operation instruction based on the first information for communication,
the control device further includes:
a first storage that stores a plurality of pieces of first information for communication associated with a plurality of first operation instructions;
a first reader that, when the first input unit receives the first input, reads out, from the first storage, the first information for communication corresponding to the first operation instruction assigned to the first input;

a second input unit that receives, from the operator, an input of a second operation instruction for the speech recognition-capable electronic device and an input of second information for communication corresponding to the second operation instruction; and a writer that, when the second input unit receives the input of the second operation instruction and the input of the second information for communication, writes, into the first storage, the second information for communication associated with the second operation instruction, the first input unit further receives, from the operator, a second input to which the second operation instruction is assigned, when the first input unit receives the second input,
(i) the first reader reads out, from the first storage, the second information for communication corresponding to the second operation instruction, and
(ii) the transmitter transmits, to the voice output device, the second information for communication read out by the first reader, the receiver further receives the second information for communication from the control device, and the output unit, when the receiver receives the second information for communication, outputs a second voice for the second operation instruction based on the second information for communication.

10. The electronic device controlling system according to claim 9, wherein
the first information for communication and the second information for communication are each voice data.

11. The electronic device controlling system according to claim 9, wherein
the first information for communication and the second information for communication are each a voice data index,
the voice output device further includes:
a second storage that stores a plurality of pieces of voice data associated with a plurality of voice data indices; and
a second reader that reads out, from the second storage, voice data corresponding to the first information for communication or the second information for communication, and
the output unit outputs the first voice or the second voice based on the voice data read out by the second reader.

12. The electronic device controlling system according to claim 9, wherein
the first information for communication is a first voice data index,
the second information for communication is second voice data,
the voice output device further includes:
a second storage that stores a plurality of pieces of first voice data associated with a plurality of first voice data indices; and
a second reader that, when the receiver receives the first information for communication, reads out, from the second storage, first voice data corresponding to the first voice data index serving as the first information for communication, and
the output unit,
(i) when the receiver receives the first information for communication, outputs the first voice based on the first voice data read out by the second reader, or
(ii) when the receiver receives the second information for communication, outputs the second voice based on the second voice data serving as the second information for communication.

13. The electronic device controlling system according to claim 9, wherein
the output unit outputs the first voice in a first language,
the voice output device further includes a determining unit that determines whether the speech recognition-capable electronic device has received the first operation instruction via the first voice in the first language, and
the output unit, when it is determined that the speech recognition-capable electronic device has failed to receive the first operation instruction via the first voice in the first language, outputs the first voice in a second language different from the first language.

14. The electronic device controlling system according to claim 9, wherein
the first input unit includes at least one of a touch panel, an operation button, a camera, or a microphone.

15. The electronic device controlling system according to claim 9, wherein
the voice output device further includes:
a casing that removably holds the speech recognition-capable electronic device;
a connector that is connected to the speech recognition-capable electronic device held in the casing and that supplies power to the speech recognition-capable electronic device; and
a loudspeaker that functions as the output unit.

16. The electronic device controlling system according to claim 15, wherein
the voice output device further includes an external interface to be connected to a display device, and
the voice output device:
receives an audio and video signal from the speech recognition-capable electronic device via the connector; and
outputs the audio and video signal to the display device via the external interface.

* * * * *